(12) United States Patent
Mormile et al.

(10) Patent No.: US 7,219,898 B2
(45) Date of Patent: May 22, 2007

(54) SPRING SUPPORTED DUAL ELEMENT FACE SEAL WITH A RUN SURFACE SLEEVE

(75) Inventors: David G. Mormile, Ann Arbor, MI (US); Mark D. Vinton, Tipton, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 44 days.

(21) Appl. No.: 11/046,742

(22) Filed: Jan. 31, 2005

(65) Prior Publication Data

US 2005/0167927 A1 Aug. 4, 2005

Related U.S. Application Data

(60) Provisional application No. 60/540,468, filed on Jan. 30, 2004.

(51) Int. Cl.
*F16J 15/34* (2006.01)
(52) U.S. Cl. .................. 277/371; 277/375; 277/384; 277/385; 277/366; 277/368
(58) Field of Classification Search ............... 277/361, 277/366, 368, 379, 384, 385, 371, 374, 375
See application file for complete search history.

(56) References Cited

U.S. PATENT DOCUMENTS

| | | | | |
|---|---|---|---|---|
| 1,956,366 A | * | 4/1934 | Vedovell | 277/363 |
| 2,592,494 A | * | 4/1952 | Ullmann | 277/373 |
| 3,009,717 A | * | 11/1961 | Laser | 277/425 |
| 3,799,559 A | * | 3/1974 | Kayser | 277/374 |
| 3,972,536 A | | 8/1976 | Warner et al. | |
| 4,348,031 A | * | 9/1982 | Johnston | 277/363 |
| 4,417,734 A | | 11/1983 | Sundberg | |
| 4,462,600 A | * | 7/1984 | Johnston | 277/363 |
| 4,522,410 A | * | 6/1985 | Holzer | 277/368 |
| 4,989,882 A | | 2/1991 | Warner et al. | |
| 5,009,519 A | * | 4/1991 | Tatum | 384/94 |
| 5,251,914 A | * | 10/1993 | Tatum | 277/363 |
| 6,059,293 A | | 5/2000 | Azibert et al. | |
| 6,068,263 A | | 5/2000 | Azibert et al. | |
| 6,116,609 A | | 9/2000 | Azibert | |
| 6,120,034 A | | 9/2000 | Kowalski et al. | |
| 6,131,912 A | | 10/2000 | Azibert et al. | |
| 6,142,476 A | | 11/2000 | Iwane | |
| 6,155,572 A | | 12/2000 | Wu et al. | |
| 6,386,547 B2 | | 5/2002 | Wu et al. | |
| 2001/0010416 A1 | | 8/2001 | Wu et al. | |
| 2002/0096835 A1 | | 7/2002 | Azibert et al. | |

\* cited by examiner

*Primary Examiner*—Alison K. Pickard
(74) *Attorney, Agent, or Firm*—Robert L. Stearns; Dickinson Wright PLLC

(57) ABSTRACT

The invention provides a seal for a rotatable shaft. The seal includes an inner case mountable to the shaft and having a body and first and second flanges extending radially outward from the body. The seal includes first and second sealing discs operable to seal against the first and second flanges of the inner case. The sealing discs are immovably associated with a housing spaced from the shaft. A spring encircles the shaft and inner case to urge the sealing discs against the flanges. The spring rate of the spring is controlled to enhance sealing, reduce turning torque, and extend life of the seal.

5 Claims, 2 Drawing Sheets

SPRING SUPPORTED DUAL ELEMENT FACE SEAL WITH A RUN SURFACE SLEEVE

CROSS REFERENCE TO RELATED APPLICATIONS

This application claims the benefit of U.S. Provisional Patent Application Ser. No. 60/540,468 for a SPRING SUPPORTED DUAL ELEMENT FACE SEAL WITH A RUN SURFACE SLEEVE, filed on Jan. 30, 2004, which is hereby incorporated by reference in its entirety.

BACKGROUND OF THE INVENTION

1. Technical Field

The invention relates to a seal disposed between two relatively moveable parts wherein the seal has a relatively moveable relationship to at least one of the parts and, more specifically, the invention relates to a seal for a rotatable shaft.

2. Related Prior Art

Seals are used in a variety of applications to provide a fluid-tight connection between two parts, such as a rotating shaft and a relatively stationary housing. A first portion of the seal usually encircles the rotating shaft and a second portion is mounted to the housing. The first portion includes a rotating face that cooperates with a non-rotating face associated with the second portion.

It has been observed that providing a fully floating mechanical shaft seal free of clamping distortions and free to align itself perpendicularly to the shaft is desirable. U.S. Pat. No. 3,972,536 discloses a rotating shaft seal assembly including a first ring portion affixed to a shaft with set screws. The rotating shaft seal assembly also includes a second ring portion affixed to a housing and a seal provided between the second ring portion and the first ring portion.

SUMMARY OF THE INVENTION

The present invention provides a seal assembly for relatively moveable parts having an inner case operable to encircle a rotatable shaft. The case includes a body and first and second flanges extending radially outward from the body. The assembly also includes first and second sealing discs encircling the inner case between the first and second flanges. The discs provide respective surfaces that sealingly engage the first and second flanges. A spring also encircles the inner case between the first and second sealing discs and urges the first and second sealing discs against the first and second flanges. In a presently preferred embodiment of the invention, the spring is a wave spring.

The seal assembly according to the present invention can maintain a seal in an environment where a fluid pressure drop can occur. The spring exerts a relatively constant axial force on the sealing disc against the flanges of the inner case. Also, the sealing discs include inner apertures that are sized to permit transverse movement of the shaft.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
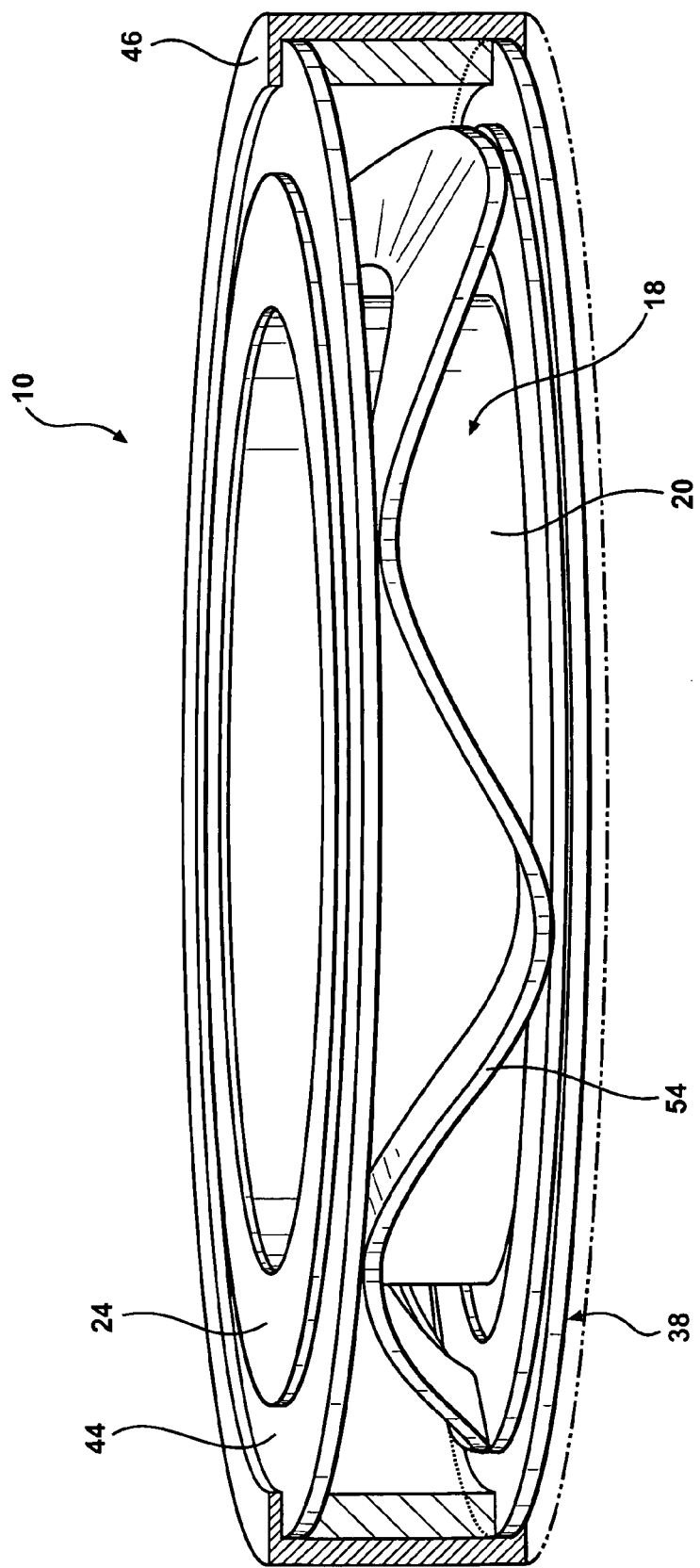
FIG. 1 is a perspective, partial cross-section view of a seal assembly according to the exemplary embodiment of the invention.
Figure 2:
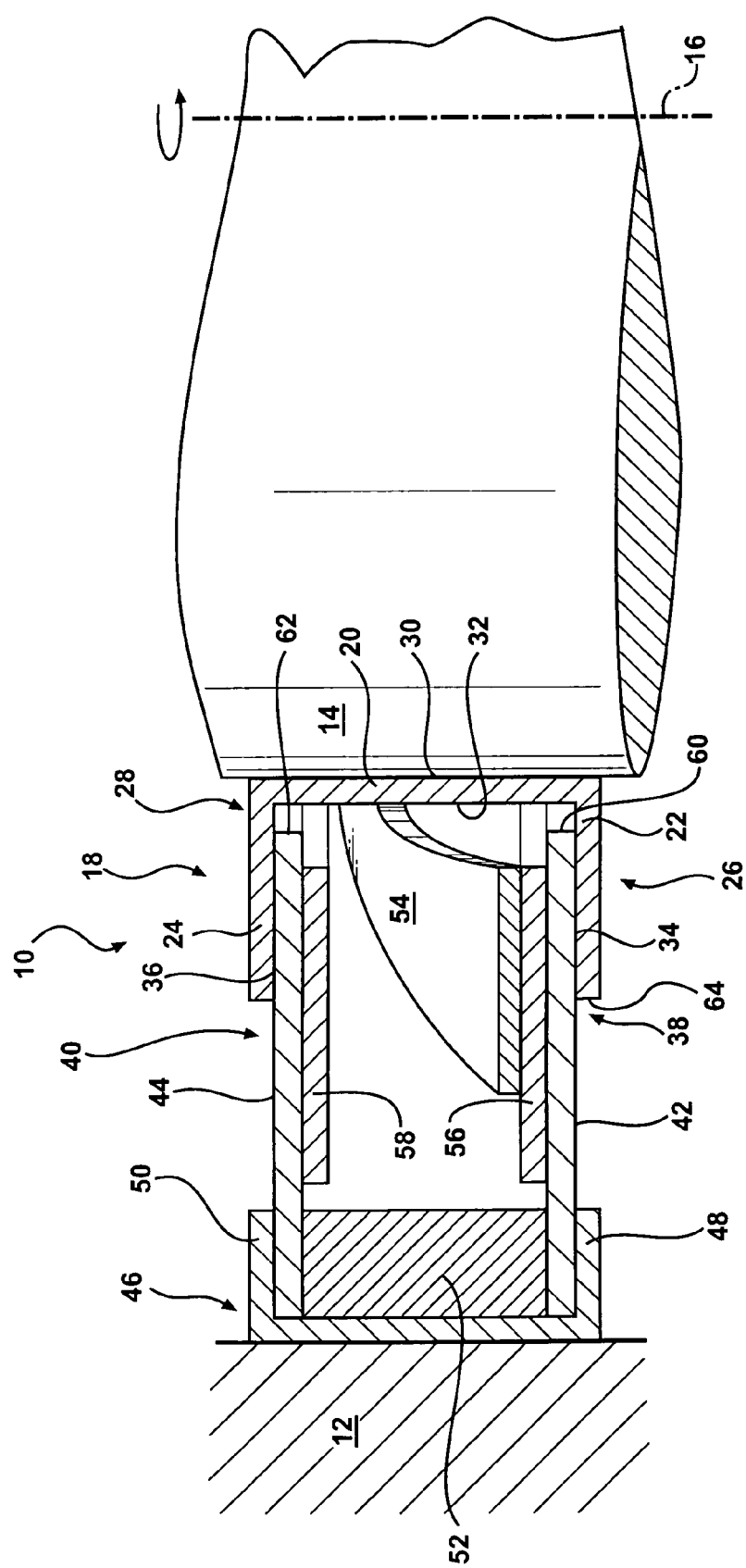
FIG. 2 is a cross-sectional view of the exemplary embodiment of the seal assembly shown in FIG. 1 in an operating environment.

Referring now to FIGS. 1 and 2, the present invention provides a seal assembly 10 for providing a seal between relatively moveable parts, such as a housing 12 and a shaft 14. The shaft 14 is rotatable about an axis 16 relative to the housing 12. The housing 12 and shaft 14 can be assembled to a vehicle. In alternative embodiments of the invention, the seal can be disposed in any environment having a rotating shaft and a stationary structure.

The assembly 10 includes an inner case 18 disposable in axially and rotatably fixed relation about the rotatable shaft 14 for rotation therewith. The inner case 18 rotates in response to rotation of the shaft 14 about the axis 16. The inner case 18 includes a body 20 and first and second flanges 22, 24 extending from opposite ends 26, 28 of the body 20. A length of the body 20 is defined between the first and second ends 26, 28. The body 20 includes an inner surface 30 facing the shaft 14 and an outer surface 32 facing away from the shaft 14. The first and second flanges 22, 24 extend radially outward with respect to the axis 16 from the outer surface 32 of the body 20. The first and second flanges 22, 24 define inwardly facing sealing surfaces 34, 36, respectively.

The seal assembly 10 also includes first and second sealing discs 38, 40 that encircle the body 20 adjacent the first and second flanges 22, 24. The sealing discs 38, 40 extend substantially perpendicular to the axis 16. The discs 38, 40 define surfaces 42, 44, respectively, that sealingly engage the surfaces 34, 36, respectively. In alternative embodiments of the invention, the sealing discs 38, 40 could be frusto-conical or any desired shape between the sealing surfaces 34, 36 and the outer case 46. It is preferred that the discs 38, 40 be disc-shaped for sealing engagement with the sealing surfaces 34, 36.

The sealing discs 38, 40 are substantially fixed to the housing 12. For example, the flanges 22, 24 move relative to the discs 38, 40 when the shaft 14 is rotating. In the exemplary embodiment of the invention, the discs 38, 40 are fixedly associated with an outer case 46 which is mounted to the housing 12. The outer case includes first and second flanges 48, 50. The discs 38, 40 are pressed against the flanges 48, 50 with a spacer element 52.

The assembly 10 also includes a spring 54 for constantly urging the first and second sealing discs 38, 40 against the first and second flanges 22, 24, respectively. The spring 54 encircles the body 20 between the first and second sealing discs 38, 40. In a presently preferred embodiment of the invention, the spring 54 is a wave spring. The spring rate of the spring 54 is controlled to control the sealing force between the surfaces 34, 42 and the surfaces 36, 44. The rate of wear of the assembly can be controlled by controlling the sealing force. For example, the greater the spring force, the greater the sealing force and the shorter the life of the assembly.

The spacer element 52 cooperates with the spring 54 such that the radially outermost ends of the discs 38, 40 are substantially fixed relative to one another whereas the radially innermost ends of the discs 38, 40 are moveable relative to one another. As a result, the portion of the seal assembly 10 closest to the moving shaft 14 is relatively more robust while the portion of the seal assembly 10 furthest to the moving shaft 14 is relatively more rigid. The portion of the seal assembly 10 closest to the moving shaft 14 can accommodate slight movement of the shaft 14 along the axis 16. The spacer element 52 can be integral with the outer case 46.

Also, the rate of turning torque required to overcome frictional force between the discs 38, 40 and the flanges 22, 24 can be controlled by controlling the spring rate of the spring 54. For example, the greater the spring rate, the greater the turning torque required to overcome friction forces. In a presently preferred embodiment of the invention, the assembly 10 includes first and second washers 56, 58, to enhance engagement of the spring 54 with the first and second sealing discs 38, 40. The washer 56 is positioned between the spring 54 and the sealing disc 38. The washer 56 is positioned between the spring 54 and the sealing disc 40.

The spring 54 enhances the robustness of the seal between the sealing discs 38, 40 and the flanges 22, 24. For example, in an operating environment where the fluid sealed off by the assembly 10 is subjected to pressure drops, the spring 54 can compensate for pressure drops by providing a relatively constant sealing force. The spring 54 acts concurrently on the sealing cooperation between the surfaces 34, 42 and between the surfaces 36, 44.

The first and second sealing discs 38, 40 define apertures 60, 62 facing the outer surface 32 of the body 20. The aperture 60, 62 are sized larger than the outside diameter of the outer surface 32 and a gap is defined between the apertures 60, 62 and the outer surface 32. The gap accommodates movement of the shaft 14 transverse to the axis 16.

The radial or transverse overlap between the flanges 22, 24 with respect to the sealing discs 38, 40 is determined in view of the extent of transverse movement of the shaft 14. For example, the flange 22 and the first sealing disc 38 radially overlap between the aperture 60 and a surface 64 defined by the flange 22. The extent of this radial overlap is selected such that when the shaft 14 is offset from the axis 16 a maximum possible distance, the radial distance between the aperture 60 and the surface 64 is sufficient to seal the surface 34 with the surface 42.

Obviously, many modifications and variations of the present invention are possible in light of the above teachings. It is, therefore, to be understood that within the scope of the invention may be practiced otherwise than as specifically described. The invention is defined by the claims.

What is claimed is:

1. A seal assembly for providing a seal between relatively moveable parts further comprising:
   an inner case operable to fixedly encircle a rotatable shaft and having a body defining length and first and second flanges extending from opposite ends of said body;
   first and second sealing discs encircling said body and respectively disposed adjacent said first and second flanges;
   a spring encircling said body and urging said first and second sealing discs against said first and second flanges respectively, wherein said spring is further defined as a wave spring; and
   first and second washers respectively disposed on opposite sides of said wave spring wherein said first washer being disposed between said wave spring and said first sealing disc and said second washer being disposed between said wave spring and said second sealing disc.

2. A seal assembly for providing a seal between relatively moveable parts comprising:
   an inner case operable to fixedly encircle a rotatable shaft and having a body defining length and first and second flanges extending from opposite ends of said body;
   first and second sealing discs encircling said body and respectively disposed adjacent said first and second flanges;
   a spring encircling said body and urging said first and second sealing discs against said first and second flanges respectively; and
   an outer case encircling said first and second sealing discs and having a second body and third and fourth flanges extending from opposite ends of said second body, wherein said first sealing disc being adjacent said third flange and said second sealing disc being adjacent said fourth flange.

3. The seal assembly of claim 2 further comprising:
   a spacer element disposed between said first and second sealing discs and between said third and fourth flanges to maintain said first sealing disc and said third flange in contact with one another and to maintain said second sealing disc and said fourth flange in contact with one another.

4. The seal assembly of claim 2 wherein said inner case is rotatable relative to said first and second sealing discs.

5. The seal assembly of claim 2 wherein said first and second sealing discs respectively include first and second apertures radially spaced from said body.

* * * * *